3,518,259
CERTAIN 1,4-DIHYDRO-8-[2-(5-NITRO-2-FURYL) VINYL OR LOWER ALKYLENE] - 4 - OXO - 1,7-NAPHTHYRIDINE-3-CARBOXYLATES

George Y. Lesher, Schodack, N.Y., assignor to Sterling Drug Inc., New York, N.Y., a corporation of Delaware
No Drawing. Filed Oct. 2, 1967, Ser. No. 671,947
Int. Cl. C07d 31/36
U.S. Cl. 260—240    9 Claims

ABSTRACT OF THE DISCLOSURE

1-$R_1$-3-(COOR) - 1,4 - dihydro-8-[2-(5-nitro-2-furyl)-Y]-4-oxo-1,7-naphthyridines where $R_1$ and R are each H or lower-alkyl and Y is CH=CH, CH=C(CH$_3$) or CH(OH)CH$_2$, having antibacterial properties, are prepared by reacting a 1-$R_1$-3-(COOR)-1,4-dihydro-8-methyl (or ethyl)-1,7-naphthyridine with 5-nitro-2-furaldehyde. The compounds where Y is CH(OH)CH$_2$, obtained as side products from the 8-methyl compounds, are readily converted to the preferred compounds where Y is CH=CH by reaction with a dehydrating agent, e.g., acetic anhydride.

---

This invention relates to 1,7-naphthyridine derivatives and to processes for their preparation.

The invention sought to be patented, in one composition aspect, resides in the class of compounds which I designate 1-(lower-alkyl)-1,4-dihydro-8-[2-(5-nitro-2-furyl)vinyl]-4-oxo-1,7 - naphthyridine-3-carboxylic acids and lower-alkyl esters thereof. Accordingly, I depict these compounds as having 2-(5-nitro-2-furyl)vinyl attached to the 8-position of 1-(lower-alkyl)-3-(COOR)-1,4-dihydro-4-oxo-1,7-naphthyridines where R is H or lower alkyl. Optionally, the vinyl moiety can be substituted at its 1-position by methyl. The tangible embodiments of this composition aspect of the invention possess the inherent applied use characteristics of having antibacterial properties, as determined by standard bacteriological evaluation procedures.

Without limiting the generality of the foregoing illustrative and preferred embodiments of my 1-(lower-alkyl)-3-(COOR)-1,4-dihydro-8-[2-(5-nitro - 2 - furyl)vinyl]-4-oxo-1,7-naphthyridines are those of Formula I

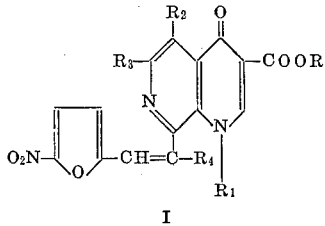

I where R, $R_2$ and $R_3$ are each H or lower-alkyl, $R_1$ is lower-alkyl, and $R_4$ is H or CH$_3$. Optionally, $R_3$ can be other substituents, e.g., lower-alkoxy, hydroxy, amino, lower-alkanoylamino.

Each of the terms "lower-alkyl," "lower-alkoxy" and "lower-alkanoyl," as used throughout this specification, e.g., as used in the definitions for $R_3$ in Formula I, means alkyl, alkoxy, or alkanoyl radicals having from one to six carbon atoms which can be arranged as straight or branched chains, among which are, for purposes of illustration but without limiting the generality of the foregoing, methyl, ethyl, n-propyl, 2-butyl and n-hexyl for lower-alkyl; by methoxy, ethoxy, n-propoxy, isopropoxy, isobutoxy, n-amoxy and n-hexoxy for lower alkoxy; and by formyl, acetyl, propionyl (n-propanoyl), isobutyryl (2-methyl-n-propanoyl) and caproyl (n-hexanoyl) for lower-alkanoyl.

The invention sought to be patented, in another composition aspect, resides in the class of compounds which I designate 1,4-dihydro-4-oxo-8-[2-(5-nitro - 2 - furyl) vinyl]-1,7-naphthyridine-3-carboxylic acids and lower-alkyl esters thereof. Accordingly, I depict these compounds as having 2-(5-nitro-2-furyl)vinyl attached to the 8-position of 3-(COOR)-1,4-dihydro-4-oxo-1,7-naphthyridines where R is H or lower-alkyl. The tangible embodiments of this composition aspect of the invention are useful as intermediates for the preparation of the corresponding 1-(lower-alkyl) compounds described hereinabove e.g., those illustrated by Formula I, and also these embodiments possess the inherent applied use characteristics of having antibacterial and antiviral properties, as determined by standard chemotherapeutic evaluation procedures. These compounds exist in tautomeric forms. Without limiting the generality of the foregoing, illustrative and preferred embodiments of the 4-oxo-3-(COOR)-1,4-dihydro-8-[2-(5-nitro - 2 - furyl)vinyl]-4-oxo-1,7-naphthyridines are those of Formula I above where $R_1$ is H. The tautomerism of the 3-(COOR)-1,4-dihydro-8-[2-(5-nitro-2-furyl)vinyl]-4-oxo-1,7-naphthyridines is illustrated as follows with Formulas II and IIA for said preferred embodiments:

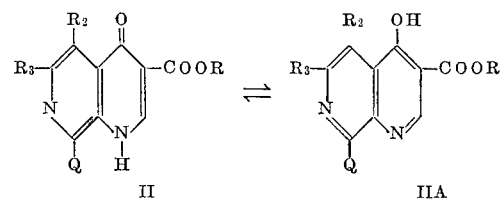

where R, $R_2$ and $R_3$ have the meanings given above for Formula I and Q designates 2-(5-nitro-2-furyl)vinyl or 1-methyl-2-(5-nitro-2-furyl)vinyl. As with all tautomeric systems, the rate of transformation II/IIA, and the ratio II⇌IIA are dependent on the thermodynamic environment, including the state of aggregation; so that measurements by any particular technique do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as II and I have preferred to use the names based on structure II, although it is understood that either or both structures are comprehended.

The invention sought to be patented, in its process aspect, resides in the process for producing a 1-$R_1$-1,4-dihydro-3-(COOR)-4-oxo-8-[2-(5-nitro - 2 - furyl)-Y]-1,7-naphthyridine, where R and $R_1$ are each H or lower-alkyl and Y is CH=CH or CH=CH(CH$_3$), which comprises reacting the corresponding 1-$R_1$-1,4-dihydro-3-(COOR)-4-oxo-8-methyl(or ethyl) - 1,7 - naphthyridine with 5-nitro-2-furaldehyde or a functional derivative thereof, e.g., its acetal, thioacetal, bisulfite or acetal diacetate, the final product where Y is CH=CH being obtained from the 8-methyl intermediate and final product where Y is CH=C(CH$_3$), from the 8-ethyl intermediate.

The manner and process of making and using the instant invention will now be generally described so as to enable a person skilled in the art of chemistry to make and use the same, as follows:

The process aspect of the invention is conveniently carried out by heating the reactants, i.e., a 1-$R_1$-1,4-dihydro-3-(COOR)-4-oxo-8-methyl(or ethyl) - 1,7 - naphthyridine and 5-nitro-2-furaldehyde or functional derivative thereof in the presence of a suitable acidic condensing agent: for example, a lower-alkanoic acid, e.g., formic acid, acetic acid, propionic acid; a lower-alkanoic acid anhydride, e.g., acetic anhydride, propionic anhydride; a mineral acid, e.g., hydrochloric acid, sulfuric acid, phosphoric acid; an acidic metal halide, e.g., zinc chloride, aluminum chloride. A liquid condensing agent also can serve as a solvent. The reaction was run preferably using acetic acid or a mixture of acetic acid and acetic anhydride. Since the desired product is sensitive to light, the reaction container is wrapped in aluminum foil to exclude light from the reaction mixture; any other means of excluding light can be employed. The temperature of the reaction, while not critical, is preferably between 100 and 125° C., with temperatures between about 50 and 150° C. being suitable. The reactants are generally known compounds prepared by known methods. When the reaction is run in acetic acid, there results a mixture of the desired 1-$R_1$-3-(COOR)-1,4-dihydro-8-[2-(5-nitro-2-furyl)vinyl]-4-oxo-1,7-naphthyridine and the corresponding compound where the vinyl double bond is "hydrated," i.e., 1-$R_1$-3-(COOR)-1,4-dihydro-8-[2 - hydroxy-2-(5 - nitro-2-furyl)ethyl]-4-oxo-1,7-naphthyridine where R and $R_1$ are each H or lower-alkyl. The latter compound, which also has antibacterial properties, is readily dehydrated and converted to the corresponding desired vinyl compound by treating with a dehydrating agent, e.g., by adding acetic anhydride to the reaction mixture and heating; alternatively, the dehydration can be carried out without isolating the intermediate hydroxy compound by conducting the reaction in a mixture of acetic acid and acetic anhydride.

The above-noted 1-$R_1$-3-(COOR)-1,4-dihydro-8 - [2-hydroxy-2-(5-nitro-2-furyl)ethyl - 4 - oxo - 1,7 - naphthyridines where $R_1$ and R are each H or lower-alkyl constitute another composition aspect of the invention. These compounds and the corresponding 8-[2-(5-nitro-2-furyl)vinyl] and 8-[1-methyl-2-(5-nitro-2-furyl)vinyl] compounds together can be designated as 1-$R_1$-3-(COOR)-1,4-dihydro-8-[2-(5-nitro-2-furyl-Y] - 4 - oxo-1,7-naphthyridine where $R_1$ and R are each H or lower-alkyl, and Y is CH=CH, CH=C($CH_3$) or CH(OH)$CH_2$.

The 1-$R_1$-1,4-dihydro-3-(COOR)-4-oxo-8-[2-(5-nitro-2-furyl)-Y]-1,7-naphthyridines where $R_1$ is lower-alkyl and Y is CH=CH or CH=C($CH_3$) are prepared preferably by the above process using the corresponding 1-(lower-alkyl)-1,4-dihydro-3-(COOR)-4-oxo - 8 - methyl- (or ethyl)-1,7-naphthyridine; alternatively, they are prepared by using the corresponding 1-unsubstituted compound in the above process and then alkylating the resulting 1,4-dihydro-3-(COOR)-8-[2-(5-nitro-2-furyl)-Y]-4-oxo-1,7-naphthyridine, e.g., by reaction with a lower-alkyl ester of a strong inorganic acid or an organic sulfonic acid, said ester having the formula $R_1$-An where An is the anion of a strong inorganic acid or an organic sulfonic acid, e.g., chloride, bromide, iodide, sulfate, methanesulfonate, benzenesulfonate and para-toluenesulfonate. The alkylation step is preferably run in the presence of an acid-acceptor using the chloride, bromide or iodide because of the ready availability of the requisite lower-alkyl halides. The acid-acceptor is a basic substance which preferably forms freely water-soluble by-products easily separable from the product of the reaction, including for example, sodium hydroxide, potassium hydroxide, sodium carbonate, potassium carbonate, potassium bicarbonate, sodium alkoxides, potassium alkoxides, sodium amide, and the like. The purpose of the acid-acceptor is to take up the hydrogen halide (or HAn) which is split out during the the course of the reaction. The reaction can be carried out in either the presence or absence of a suitable solvent, but preferably in a solvent such as a lower-alkanol, acetone, dioxane, dimethylformamide, dimethyl sulfoxide, or a mixture of solvents, e.g., a mixture of water and a lower-alkanol. The reaction is generally carried out at a temperature between about room temperature (about 25° C.) and 150° C., preferably heating on a steam bath in a stirred mixture a dimethylformamide and anhydrous potassium carbonate.

The 1-$R_1$-3-(COOR)-8-[2-(5-nitro-2-furyl)-Y]-4-oxo-1,7-naphthyridines where $R_1$ is H or lower-alkyl and Y is CH=CH, CH=C($CH_3$) or CH(OH)$CH_2$ are obtained as the 3-carboxylic acid (R is H) or the lower-alkyl ester (R is lower-alkyl), and either is readily converted to the other by known methods of esterification or hydrolysis.

Also within the scope of the invention are cationic salts of the above-described 1-$R_1$-1,4-dihydro-4-oxo-8-[2-(5-nitro-2-furyl)-Y]-1,7-naphthyridine - 3 - carboxylic acids where $R_1$ is H or lower-alkyl and Y is CH=CH, CH=CH($CH_3$) or CH(OH)$CH_2$. Preferred types of salts are those having cations which do not increase the toxicity of the compound as a whole toward animal organisms. These comprise the alkali metal salts e.g., the sodium or potassium salts; the lower-alkaline earth metal salts, e.g., magnesium or calcium salts; and, the ammonium or organic amine salts. Although medicinally acceptable salts are preferred, other and all cationic salts are within the scope of the invention. All such salts, including those having toxic cations, are useful in characterizing the free acids and as intermediates in purification of the free acids. The salts are prepared from the acids using methods illustrated hereinbelow in the examples.

The molecular structures of the compounds of the invention were assigned on the basis of study of their infrared and NMR spectra, and confirmed by the correspondence of calculated and found values for the elementary analyses for representative examples.

The 1-$R_1$-3-(COOR)-1,4-dihydro-8-[2-(5-nitro-2-furyl)-Y]-4-oxo-1,7-naphthyridine composition aspects of the invention when tested according to standard in vitro bacteriological evaluation procedures were found to have antibacterial activity, for example, against *Staphylococcus aureaus, Eberthella coli, Porteus vulgaris* and *Pseudomonas aeruginosa*, at test concentration levels of 0.025 to 100 mcg./cc., as illustrated below in examples. The embodiments were found to have significant in vivo activity against gram-positive bacteria, e.g., *Staphylococcus aureus, Streptococcus pyogenes* and *Diplococcus pneumoniae*, in mice, whether administered subcutaneously, orally or intraperitoneally, at dose levels in the range of about 1 to 200 mg./kg./day for five days.

The 3 - (COOR)-1,4-dihydro-8-[2-(5-nitro-2-furyl)vinyl]-4-oxo-1,7-naphthyridines of the invention, e.g., compounds of Formula I where $R_1$ is H, have been found to have antiviral activity when tested by standard procedures; for example, when administered subcutaneously to mice at dose levels in the range of about 50 to 200 mg./kg./day for five days, they were found to inhibit influenza pathogenesis when the mice were later (next day) infected intranasally with influenza virus. The activity was evidenced by statistical differences of lung weight between the treated mice and infected non-medicated controls.

The best mode contemplated for carrying out the invention will now be set forth as follows.

EXAMPLE 1

6-ethyl-1,4-dihydro-1-methyl-8-[2-(5-nitro-2-furyl)-vinyl]-4-oxo-1,7-naphthyridine-3-carboxylic acid was prepared as follows: A 10.8 g. portion of 6-ethyl-1,4-dihydro-1,8-dimethyl - 4 - oxo-1,7-naphthyridine-3-carboxylic acid was dissolved in 100 cc. of hot acetic acid in a flask wrapped with aluminum foil to exclude light from the solution. The hot solution was allowed to cool about 10–15° C. and there was added thereto 7.1 g. of 5-nitro-2-furaldehyde. The resulting solution was refluxed for two hours with stirring and then there was added 70 cc. of acetic anhydride whereupon the solid product separated. The reaction mixture was refluxed with stirring for an additional 45 minutes and then allowed to cool to room temperature. The solid was collected, washed sparingly with acetic acid, washed next with ethyl acetate, and dried at 65° C. for 7 hours in a vacuum oven to yield 10.7 g. of 6-ethyl-1,4-dihydro-1-methyl-8-[2-(5- nitro-2-furyl)vinyl]-4-oxo - 1,7 - naphthyridine-3-carboxylic acid, M.P. 288–290° C. with decomposition.

*Analysis.*—Calcd. for $C_{18}H_{15}N_3O_6$ (percent): C, 58.53; H, 4.09; N, 11.39. Found (percent): C, 58.80; H, 4.16; N, 11.27.

6-ethyl-1,4-dihydro - 1 - methyl-8-[2-(5-nitro-2-furyl)vinyl]-4-oxo-1,7-naphthyridine-3-carboxylic acid was found to have in vivo activity against *Streptococcus pyogenes* in mice when administered subcutaneously at dose levels of 25 and 200 mg./kg./day for five days (10 out of 10 mice survived at each dose level) and against *Diplococcus pneumoniae* in mice when administered subcutaneously at a dose level of 200 mg./kg./day for five days (10 out of 10 mice survived).

EXAMPLE 2

The following reaction of 1,4-dihydro-1,6,8-trimethyl-4-oxo-1,7-naphthyridine-3-carboxylic acid with 5-nitro-2-furaldehyde in refluxing acetic acid yielded a mixture of 1,4-dihydro-1,6-dimethyl-8-[2-(5-nitro-2-furyl)vinyl]-4-oxo-1,7-naphthyridine-3-carboxylic acid and 1,4-dihydro-8-[2-hydroxy-2-(5 - nitro-2-furyl)ethyl]-1,6-dimethyl-4-oxo-1,7-naphthyridine-3-carboxylic acid: A solution containing 11.6 g. of 1,4-dihydro-1,6,8-trimethyl-4-oxo-1,7-naphthyridine-3-carboxylic acid, 15 g. of 5-nitro-2-furaldehyde and 200 cc. of acetic was refluxed for 4.5 hours in a flask wrapped with aluminum foil to exclude light from the reaction mixture. The reaction mixture was allowed to cool to room temperature and the solid that separated was collected and washed sparingly with acetic acid. The acetic acid filtrate and washings were combined, set aside and worked up as described hereinbelow. The solid was recrystallized from 125 cc. of dimethylformamide using decolorizing charcoal to yield 8.7 g. of 1,4-dihydro-1,6-dimethyl-8-[2-(5 - nitro-2-furyl)vinyl]-4-oxo-1,7-naphthyridine-3-carboxylic acid, M.P. 282–284° C. with decomposition.

*Analysis.*—Calcd. for $C_{17}H_{13}N_3O_6$ (percent): C, 57.47; H, 3.69; N, 11.83. Found (percent): C, 57.68; H. 3.77; N, 11.55.

The above combined acetic acid filtrate and washings were concentrated by heating in vacuo and the remaining residue was triturated with ethyl acetate. The mixture was filtered and the solid recrystallized from 250 cc. of acetic acid using decolorizing charcoal to yield 2.0 g. of yellow product, M.P. 223–224° C. after drying. This product was combined with 1.0 g. of the same product, M.P. 223–224° C. obtained from another run and the 3.0 g. of product was recrystallized from 250 cc. of acetic acid to yield 1.70 g. of lemon yellow 1,4-dihydro-8-[2-hydroxy-2-(5-nitro-2 - furyl)ethyl]-1,6-dimethyl-4-oxo-1,7-naphthyridine-3-carboxylic acid, M.P. 223–224° C.

*Analysis.*—Calcd. for $C_{17}H_{15}N_3O_7$ (percent): C, 54.69; H, 4.05; N, 11.26. Found (percent): C, 54.76; H, 4.09; N, 10.94.

1,4-dihydro-1,6-dimethyl-8-[2-(5 - nitro-2-furyl)vinyl]-4-oxo-1,7-naphthyridine-3-carboxylic acid also was prepared following the procedure described in Example 1 using corresponding molar equivalent quantities of 1,4-dihydro-1,6,8-trimethyl - 4 - oxo-1,7-naphthyridine-3-carboxylic acid, 5-nitro-2-furaldehyde, acetic acid and acetic anhydride.

1,4 - dihydro - 1,6-dimethyl - 8-[2-(5-nitro-2-furyl)-vinyl] - 4-oxo-1,7-naphthyridine-3-carboxylic acid was found to have in vivo activity against *Staphylococcus aureus, Streptococcus pyogenes* and *Diplococcus pneumoniae* in mice, having the following respective $ED_{50}$ values (doses which protect 50 percent of the mice infected with the indicated organisms): oral, intraperitoneal and subcutaneous $ED_{50}$ values of 36.6, 2.3 and 32.6 mg./kg./day for five days against *Staphylococcus aureus;* oral, intraperitoneal and subcutaneous $ED_{50}$ values of 1.25, 0.44 and 0.76 mg./kg./day for five days against *Streptococcus pyogenes;* and, oral, intraperitoneal and subcutaneous $ED_{50}$ values of 2.0, 2.9 and 0.45 mg./ kg./day for five days against *Diplococcus pneumoniae.* This same compound when tested according to standard in vitro bacteriological evaluation procedures was found to have bacteriostatic activity at concentrations of 0.25, 0.75, 50 and 50 mcg./cc., respectively, against *Staphylococcus aureus, Eberthella coli, Proteus vulgaris* and *Pseudomonas aeruginosa.*

1,4 - dihydro - 8-[2-hydroxy-2-(5-nitro-2-furyl)ethyl]-1,6 - dimethyl-4-oxo-1,7-naphthyridine-3-carboxylic acid was found to have in vitro bacteriostatic activity at concentrations of 2.5, 5.0, 100, and 100 mcg./cc., respectively, against *Staphylococcus aureus, Eberthella coli, Proteus vulgaris* and *Pseudomonas aeruginosa.*

EXAMPLE 3

Potassium 1,4 - dihydro-1,6-dimethyl-8-[2-(5-nitro-2-furyl)vinyl] - 4-oxo-1,7-naphthyridine-3-carboxylate was prepared as folows: A 12.85 g. portion of 1,4-dihydro-1,6 - dimethyl - 8 - [2-(5-nitro-2-furyl)vinyl]-4-oxo-1,7-naphthyridine-3-carboxylic acid was heated with 500 cc. of pyridine to about 75° C., whereupon most of the acid dissolved and to the hot mixture was added dropwise with stirring a solution containing 2.36 g. of 86% potassium hydroxide in 65 cc. of methanol. The heavy orange precipitate was collected, washed with dry ether and dried in vacuo at 80° C. to yield 13.5 g. of potassium 1,4-dihydro - 1,6 - dimethyl-8-[2-(5-nitro-2-furyl)vinyl]-4-oxo-1-7-naphthyridine -3-carboxylate.

*Analysis.*—Calcd. for $C_{17}H_{12}KN_3O_6$ (percent): Acid, 90.2; K, 9.88; N, 10.68. Found (percent): Acid 89.0; K. 9.23; $H_2O$, 2.04. Found (dry basis) (percent): Acid, 90.5; K, 9.42; N, 10.66.

Potassium 1,4-dihydro-1,6-dimethyl-8-[2 - (5-nitro-2-furyl)-vinyl] - 4-oxo-1,7-naphthyridine-3-carboxylate was found to have $ED_{50}$ values of 1.25 and 5.1 mg./kg./day for five days, respectively, against *Streptococcus pyogenes* and *Diplococcus pneumoniae* in mice when administered orally.

In the following preparation of the above potassium salt using dimethylsulfoxide as the recrystallizing solvent, the salt was isolated as its hemidimethylsulfoxide: A 3.55 g. portion of 1,4-dihydro-1,6-dimethyl-8-[2-(5-nitro-2-furyl) - vinyl]-4-oxo-1,7-naphthyridine-3-carboxylic acid was dissolved in 100 cc. of dimethylsulfoxide heated to 80° C. The solution was allowed to cool to 50° C. and to it was added dropwise with stirring a solution of 0.65 g. of 86% potassium hydroxide dissolved in 20 cc. of methanol. The mixture was stirred for another 10 minutes; the precipitate was collected, washed with a little dimethylsulfoxide, slurried with ether, the ether mixture filtered twice through a sintered glass filter, and the product dried at 80° C. in vacuo to yield 3.7 g. of potassium 1,4-dihydro-1,6-dimethyl-8[2-(5-nitro-2-furyl)-vinyl] - 4-oxo - 1,7-naphthyridine-3-carboxylate hemidimethylsulfoxide.

EXAMPLE 4

Ethyl 1,4 - dihydro-6-methyl - 8-[2-(5-nitro-2-furyl)-vinyl] - 4-oxo-1,7-naphthyridine-3-carboxylate was prepared as follows: A mixture containing 24.6 g. of ethyl 1,4 - dihydro-6,8-dimethyl-4-oxo-1,7-naphthyridine-3-carboxylate, 14.2 g. of 5-nitro-2-furaldehyde and 450 cc. of acetic acid was refluxed for 30 minutes, concentrated to about one-half the original volume and then allowed to cool to room temperature. The separated solid was collected, washed successively with acetic acid and ethyl acetate, and then recrystallized from dimethylformamide to yield 15.8 g. of ethyl 1,4-dihydro-6-methyl-8-[2-(5-nitro-2-furyl)-vinyl]-4-oxo - 1,7 - naphthyridine - 3 - carboxylate, M.P. 242–244° C. with decomposition.

*Analysis.*—Calcd. for $C_{18}H_5N_3O_6$ (percent): C, 58.53; H, 4.09; N, 11.38. Found (percent): C, 58.43; H, 3.90; N, 11.14.

Ethyl 1,4 - dihydro-6-methyl-8-[2-(5 - nitro-2-furyl)-vinyl]-4-oxo-1,7-naphthyridine-3-carboxylate was found to have in vivo activity against *Streptococcus pyogenes* when administered subcutaneously at dose levels of 25 and 200 mg./kg./day for five days (4 out of 10 and 10 out of 10 mice survived at the respective dose levels). This same compound was found to have in vitro bacteriostatic activity at concentrations of 0.025, 0.50, 100 and 100 mcg./cc., respectively, against *Staphylococcus aureus*, *Eberthella coli*, *Proteus vulgaris* and *Pseudomonal aeruginosa*.

Ethyl 1,4 - dihydro-6-methyl-8-[2 - (5-nitro-2-furyl)-vinyl]-4-oxo-1,7-naphthyridine-3-carboxylate was found to have in vivo antiviral activity by inhibiting influenza pathogenesis in mice by subcutaneous injection of doses of 50 and 100 mg./kg./day for five days to mice infected intranasally the second day of medication with influenza virus.

EXAMPLE 5

The following preparation illustrates the 1-alkylation of a 1,4-dihydro-3-(COOR)-8-[2-(5-nitro-2-furyl)vinyl]-4-oxo-1,7-naphthyridine to obtain the corresponding 1-(lower-alkyl) compound: To a stirred suspension containing 3.7 g. of ethyl 1,4-dihydro-6-methyl-8-[2-(5-nitro-2-furyl)vinyl]-4-oxo-1,7-naphthyridine-3-carboxylate and 50 cc. dimethylformamide was added 6 g. of potassium carbonate and then 1.25 cc. of methyl iodide. The resulting mixture was heated on a steam bath with stirring for 2 hours, the reaction mixture was allowed to cool and the precipitate was collected and triturated with water. The solid was collected and recrystallized from acetic acid to give ethyl 1,4 - dihydro - 1,6 - dimethyl-8-[2-(5-nitro-2-furyl)vinyl]-4-oxo-1,7-naphthyridine-3-carboxylate, M.P. 225–227° C. To a suspension containing 0.43 g. of said ethyl ester in a mixture of 20 cc. of acetic acid and 20 cc. of water was added 5 drops of 6 N hydrogen chloride and the resulting mixture was heated upon a steam bath for 4 hours. The reaction mixture was diluted with 74 cc. of water and a resulting precipitate was collected. The precipitate was dissolved in boiling dimethylformamide the solution was allowed to cool slightly and the resulting microcrystalline precipitate was filtered off. The filtrate was chilled to yield a fibrous solid M.P. 265° C. with decomposition, which was identified by its infrared spectrum to be 1,4 - dihydro - 1,6 - dimethyl - 8 - [2-(5-nitro-2-furyl)vinyl]-4-oxo-1,7-naphthyridine-3-carboxylic acid.

EXAMPLE 6

6-ethyl - 1,4 - dihydro-1-methyl-8-[1-methyl-2-(5-nitro-2 - furyl)vinyl]-4-oxo-1,7-naphthyridine-3-carboxylic acid was prepared as follows: A mixture containing 5.0 g. of 6,8-diethyl - 1,4 - dihydro-1-methyl-1,8-naphthyridine-3-carboxylic acid, 2.9 g. of 5-nitro-2-furaldehyde and 50 cc. of acetic acid was heated with stirring to reflux whereupon a solution was obtained. The solution was heated at reflux for 2 hours and 45 minutes, 35 cc. of acetic anhydride was added, and the resulting solution was heated for an additional 2 hours and 45 minutes. The reaction solution was concentrated in vacuo. The remaining solid was triturated with a small volume of acetic acid and collected by filtration. The solid was dried and recrystallized from acetone using decolorizing charcoal to yield 2.9 g. of 6-ethyl-1,4-dihydro-1-methyl-8-[1-methyl - 2 - (5 - nitro-2-furyl)vinyl]-4-oxo - 1,7 - naphthyridine - 3 - carboxylic acid, M.P. 245–246.5° C.

Ethyl 6 - ethyl - 1,4 - dihydro-1-methyl-8-[1-methyl-2-(5 - nitro - 2 - furyl)vinyl] - 4 - oxo-1,7-naphthyridine-3-carboxylate is obtained following the above procedure of Example 6 using a molar equivalent quantity of ethyl 6,8-diethyl - 1,4 - dihydro-1-methyl-4-oxo-1,8-naphthyridine-3-carboxylate in place of 6,8-diethyl - 1,4 - dihydro-1-methyl - 4 - oxo-1,8-naphthyridine-3-carboxylic acid.

Following the procedure described in Example 1 using corresponding molar equivalent quantities of the appropriate 1 - alkyl - 1,4 - dihydro - 8 - methyl-4-oxo-1,7-naphthyridine-3-carboxylic acid or lower-alkyl ester thereof in place of 6-ethyl - 1,4 - dihydro - 1,8 - dimethyl-4-oxo,1,7-naphthyridine-3-carboxylic acid, the corresponding 8-[2-(5 - nitro - 2 - furyl)vinyl] compounds are obtained: ethyl 1,4 - dihydro - 1,6 - dimethyl - 8 - [2-(5-nitro-2-furyl)vinyl] - 4 - oxo - 1,7-naphthyridine - 3 - carboxylate using ethyl 1,4-dihydro - 1,6,8 - trimethyl - 4 - oxo-1,7-naphthyridine-3-carboxylate; ethyl 1,4 - dihydro-1-methyl-8-[2-(5 - nitro - 2 - furyl)vinyl]-4-oxo-1,7-naphthyridine-3-carboxylate using ethyl 1,4-dihydro - 1,8 - dimethyl-4-oxo-1,7-naphthyridine - 3 - carboxylate; ethyl 6-ethyl-1,4-dihydro - 1 - methyl - 8 - [2-(5-nitro-2-furyl)vinyl]-4-oxo-1,7 - naphthyridine-3-carboxylate using ethyl 6-ethyl-1,4-dihydro - 1,8 - dimethyl - 4 - oxo-1,7-naphthyridine-3-carboxylate; ethyl 1,6 - diethyl - 1,4 - dihydro-8-[2-(5-nitro-2 - furyl)vinyl] - 4 - oxo-1,7-naphthyridine-3-carboxylate using ethyl 1,6-diethyl - 1,4 - dihydro-8-methyl-4-oxo-1,7-naphthyridine-3-carboxylate; 1,4 - dihydro-1,5,6-trimethyl-8 - [2 - (5 - nitro-2-furyl)vinyl]-4-oxo-1,7-naphthyridine-3 - carboxylic acid using 1,4-dihydro-1,5,6,8-tetramethyl-4 - oxo - 1,7-naphthyridine - 3 - carboxylic acid; ethyl 6-acetylamino - 1,4 - dihydro - 1 - methyl-8-[2-(5-nitro-2-furyl)vinyl]-4-oxo - 1,7 - naphthyridine - 3 - carboxylate using ethyl 6-acetylamino - 1,4 - dihydro - 1,8-dimethyl-4-oxo - 1,7 - naphthyridine - 3 - carboxylate; 1,4 - dihydro-6 - methoxy - 1 - methyl - 8 - [2-(5-nitro-2-furyl)vinyl]-4 - oxo - 1,7 - naphthyridine-3-carboxylic acid using 1,4-dihydro - 6 - methoxy - 1,8 - dimethyl - 4 - oxo-1,7-naphthyridine - 3 - carboxylic acid; 1,4-dihydro-6-hydroxy-1-methyl - 8 - [2 - (5-nitro-2-furyl)vinyl]-4-oxo-1,7-naphthyridine - 3 - carboxylic acid using 1,4 - dihydro-6-hydroxy - 1,8 - dimethyl - 4 - oxo-1,7-naphthyridine-3-carboxylic acid. 6-amino - 1,4 - dihydro - 1 - methyl-8-[2-(5-nitro-2-furyl)vinyl] - 4 - oxo - 1,7 - naphthyridine-3-carboxylic acid is obtained by hydrolyzing ethyl 6-acetylamino - 1,4 - dihydro - 1 - methyl - 8 - [2-(5-nitro-2-furyl)vinyl] - 4 - oxo - 1,7 - naphthyridine-3-carboxylate by heating the latter with at least a two-molar excess of aqueous hydrochloric acid. 1,4 - dihydro - 6 - methoxy-1,8-dimethyl - 4 - oxo - 1,7 - naphthyridine-3-carboxylic acid is obtained using several known steps as follows: Reaction of 3 - amino - 5 - methoxy-2-methylpyridine with a molar equivalent of diethyl ethoxymethylenemalonate to yield diethyl N - (5 - methoxy - 2 - methyl - 3 - pyrodyl-amino)methylenemalonate; heating the latter compound in diethyl phthalate to obtain ethyl 4-hydroxy-6-methoxy-8-methyl - 1,7 - naphthyridine - 3 - carboxylate; heating the latter with methyl iodide in a stirred mixture of dimethylformamide and anhydrous potassium carbonate to form ethyl 1,4-dihydro - 6 - methoxy - 1,8 - dimethyl - 4 - oxo-1,7 - naphthyridine - 3 - carboxylate; and, hydrolyzing said ethyl ester using aqueous hydrochloric acid to yield the corresponding 3-carboxylic acid.

Following the procedure described in Example 4 using corresponding molar equivalents of the appropriate 1,4-dihydro - 8 - methyl-4-oxo-1,7-naphthyridine-3-carboxylic acid or lower-alkyl ester thereof in place of ethyl 1,4-dihydro - 6,8-dimethyl-4-oxo-1,7-naphthyridine-3-carboxylate, the following corresponding 8-[2-(5-nitro-2-furyl)-vinyl] compounds are obtained; 6-ethyl-1,4-dihydro-8-[2 - (5 - nitro-2-furyl)vinyl]-4-oxo-1,7-naphthyridine-3-carboxylic acid using 6 - ethyl - 1,4-dihydro-8-methyl-4-oxo - 1,7-naphthyridine-3-carboxylic acid; 1,4-dihydro-6-methyl - 8 - [2-5-nitro-2-furyl)vinyl]-4-oxo-1,7-naphthyridine - 3-carboxylic acid using 1,4-diyhdro-6,8-dimethyl-4-oxo-1,7-naphthyridine-3-carboxylic acid; ethyl 6-ethyl-1,4 - dihydro-8-[2-(5-nitro-2-furyl)vinyl]-4-oxo-1,7-naphthyridine-3-carboxylate using ethyl 6-ethyl-1,4-dihydro-8-methyl - 4 - oxo - 1,7-naphthyridine-3-carboxylate; 1,4-dihydro - 5,6 - dimethyl-8-[2-(5-nitro-2-furyl)vinyl]-4-oxo-1,7 - naphthyridine-3-carboxylic acid using 1,4-dihydro-5,6,8-trimethyl-4-oxo-1,7-naphthyridine-3-carboxylic acid; ethyl 6 - acetylamino-1,4-dihydro-8-[2-(5-nitro-2-furyl)-vinyl]-4-oxo-1,7-naphthyridine-3-carboxylate using ethyl-6 - acetlyamino-1,4-dihydro-8-methyl-4-oxo-1,7-naphthyridine - 3 - carboxylate; ethyl 1,4-dihydro-8-[2-(5-nitro-2- furyl)vinyl]-4-oxo-1,7-naphthyridine-3-carboxylate using ethyl 1,4-dihydro-8-methyl-4-oxo-1,7-naphthyridine-3-carboxylate; and, ethyl 1,4-dihydro-6-methyl-8-[1-methyl-2-(5-nitro-2-furyl)vinyl]-4-oxo-1,7-naphthyridine-3-carboxylate using ethyl 8-ethyl-1,4-dihydro-6-methyl-4-oxo-1,7-naphthyridine-3-carboxylate.

Other 1-$R_1$-3-(COOR)-1,4-dihydro-8-[2-hydroxy-2-(5-nitro-2-furyl)ethyl]-4-oxo-1,7-naphthylridines are obtained, together with the corresponding 8-[2-5-nitro-2-furyl)-vinyl] compound, by following procedure described in Example 2 using the appropriate 1-$R_1$-3-(COOR)-1,4-dihydro-2-methyl-4-oxo-1,8-naphthyridine, 5-nitro-2-furaldehyde and acetic acid, for example: 6-ethyl-1,4-dihydro-8-[2-hydroxy-2-(5-nitro-2-furyl)-ethyl]-1-methyl-4-oxo-1,7-naphthyridine-3-carboxylic acid, ethyl 1,4-dihydro-6-methyl-8-[2-hydroxy-2-(5-nitro-2-furyl)-ethyl]-4-oxo-1,7-naphthyridine-3-carboxylate, ethyl 1,4-dihydro-8-[2-hydroxy-2-(5-nitro-2-furyl)ethyl]-1,6-dimethyl-4-oxo-1,7-naphthyridine-3-carboxylate, ethyl 1,6-diethyl-1,4-dihydro-8-[2-hydroxy-2-(5-nitro-2-furyl)ethyl]-4-oxo-1,7-naphthyridine-3-carboxylate, and ethyl 6-acetylamino-1,4-dihydro-8-[2-hydroxy-2-(5-nitro-2-furyl) ethyl]-1-methyl-4-oxo-1,7-naphthyrdine-3-carboxylate.

I claim:

1. 1-$R_1$-3-(COOR)-1,4-dihydro-8-[2-(5-nitro-2-furyl)-Y]-4-oxo-1,7-naphthyridine where $R_1$ and R are each H or lower-alkyl and Y is CH=CH, CH=C(CH$_3$) or CH(OH)CH$_2$.

2. 1-(lower-alkyl)-1,4-dihydro-8-[2-(5-nitro-2-furyl)vinyl]-4-oxo-1,7-naphthyridine-3-carboxylic acid according to claim 1 where $R_1$ is lower-alkyl, R is H and Y is CH=CH.

3. 1-(lower-alkyl)-1,4-dihydro-8-[2-hydroxy-2-(5-nitro-2-furyl)ethyl]-4-oxo-1,7-naphthyridine-3-carboxylic acid according to claim 1 where $R_1$ is lower-alkyl, R is H and Y is CH(OH)CH$_2$.

4. Lower-alkyl 1,4-diyhdro-8-[2-5-nitro-2-furyl)-vinyl]-4-oxo-1,7-naphthylridine-3-carboxylate according to claim 1 where $R_1$ is H, R is lower-alkyl and Y is CH=CH.

5. 6-ethyl-1,4-dihydro-1-methyl-8-[2-(5-nitro-2-furyl)vinyl]-4-oxo-1,7-naphthyridine-3-carboxylic acid according to claim 1 where $R_1$ is methyl, R is H, Y is CH=CH and the 6-position of the 1,7-naphthyridine ring is substituted by ethyl.

6. 1,4-dihydro-1,6-dimethyl-8-[2-(5-nitro-2-furyl)-vinyl]-4-oxo-1,7-naphthyridine-3-carboxylic acid according to claim 1 where $R_1$ is methyl, R is H, Y is CH=CH and the 6-position of the 1,7-napthyridine ring is substituted by methyl.

7. The potassium salt of the compound according to claim 6.

8. Ethyl 1,4-dihydro-6-methyl-8-[2-(5-nitro-2-furyl)-vinyl]-4-oxo-1,7-naphthyridine-3-carboxylate according to claim 1 where $R_1$ is H, R is ethyl, Y is CH=CH and the 6-position of the 1,7-naphthyridine ring is substituted by methyl.

9. 1,4-dihydro-8-[2-hydroxy-2-(5-nitro-2-furyl)-ethyl]-1,6-dimethyl-4-oxo-1,7-naphthyridine-3-carboxylic acid according to claim 1 where $R_1$ is methyl, R is H, Y is CH(OH)CH$_2$ and the 6-position of the 1,7-naphthyridine ring is substituted by methyl.

References Cited

UNITED STATES PATENTS 3,149,104  9/1964  Lesher et al. _____ 260—240
3,225,055  12/1965  Lesher _____ 260—295.5

OTHER REFERENCES

Ujiie: Chem. Pharm. Bull., Japan, vol. 14(5), pp. 461-6 (1966).

HENRY R. JILES, Primary Examiner

A. L. ROTMAN, Assistant Examiner

U.S. Cl. X.R.

260—295.5; 424—266

PO-1050
(5/69)

UNITED STATES PATENT OFFICE
CERTIFICATE OF CORRECTION

Patent No. 3,518,259      Dated June 30, 1970

Inventor(s) George Y. Lesher

It is certified that error appears in the above-identified patent and that said Letters Patent are hereby corrected as shown below:

Column 2, formula IIA, single linkage missing between $R_2$ and the 5-position of the naphthyridine ring. Column 4, line 34, "Porteus" should read --Proteus--. Column 6, line 28, "1-7" should read --1,7--. Column 8, line 1, "oxo," should read -- oxo- --; line 43, "-pyrodyl-" should read -- -pyridyl- --; line 63, "2-5" should read -- 2-(5 --; line 64, "diyhdro" should read --dihydro--; line 74, "-acetlyamino" should read -- -acetylamino --. Column 9, line 8, "naphthylridines" should read --naphthyridines--; line 9, "2-5" should read -- 2-(5 --; line 37, "2-5" should read -- 2-(5 --; line 38, "naphthylridine" should read --naphthyridine--.

SIGNED AND SEALED
NOV 10 1970

(SEAL)
Attest:

Edward M. Fletcher, Jr.
Attesting Officer

WILLIAM E. SCHUYLER, JR.
Commissioner of Patents